US010831647B2

(12) United States Patent
Tailor et al.

(10) Patent No.: US 10,831,647 B2
(45) Date of Patent: Nov. 10, 2020

(54) FLAKY TEST SYSTEMS AND METHODS

(71) Applicant: SAP SE, Walldorf (DE)

(72) Inventors: Pritesh Tailor, Vancouver (CA); Ming Li, Vancouver (CA)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 15/710,693

(22) Filed: Sep. 20, 2017

(65) Prior Publication Data

US 2019/0087315 A1    Mar. 21, 2019

(51) Int. Cl.
*G06F 11/36*    (2006.01)

(52) U.S. Cl.
CPC ...... *G06F 11/3692* (2013.01); *G06F 11/3664* (2013.01); *G06F 11/3688* (2013.01)

(58) Field of Classification Search
CPC combination set(s) only.
See application file for complete search history.

(56) References Cited

U.S. PATENT DOCUMENTS

| | | | |
|---|---|---|---|
| 9,032,259 B1 | 5/2015 | Hood | |
| 2003/0121025 A1 | 6/2003 | Farchi et al. | |
| 2005/0257086 A1* | 11/2005 | Triou, Jr. | ............ G06F 11/3688 714/25 |
| 2007/0074149 A1 | 3/2007 | Ognev et al. | |
| 2007/0168734 A1 | 7/2007 | Vasile | |
| 2009/0307763 A1* | 12/2009 | Rawlins | ............ G06F 9/44505 726/5 |
| 2014/0096113 A1 | 4/2014 | Kuehlmann et al. | |
| 2015/0033212 A1 | 1/2015 | Mizobuchi et al. | |
| 2015/0286558 A1 | 10/2015 | Bartlow et al. | |
| 2016/0328315 A1 | 11/2016 | Rajamanickam et al. | |
| 2018/0267884 A1* | 9/2018 | Dhanda | ............... G06F 11/3688 |
| 2019/0079735 A1* | 3/2019 | Noma | ................ G05B 19/0423 |
| 2019/0087315 A1 | 3/2019 | Tailor et al. | |
| 2019/0196946 A1* | 6/2019 | Budhai | ..................... G06F 8/71 |
| 2019/0243753 A1* | 8/2019 | Zhang | .................. G06F 11/368 |

OTHER PUBLICATIONS

WO 2018/227367, Identifying Flaky Test, World Intellectual Property Organization, 20/12/20185.*

(Continued)

*Primary Examiner* — Amine Riad
(74) *Attorney, Agent, or Firm* — Fountainhead Law Group P.C.

(57) ABSTRACT

In one embodiment, the present disclosure pertains to testing. In one embodiment, software tests are performed on a first software server. Tests may be repeated a plurality of times to check for consistent failures or passes. Test results are sent to a second software server. The test results are stored in one or more databases on the second software server, where particular test results are associated with one or more fields specifying whether the test was passed and whether the test was failed. Tests that were both passed and failed may be deemed "flaky" tests. The second software server may generate a query to retrieve test results from the database that both passed and failed at least one test (flaky tests). Flaky tests may be quickly retrieved and processed.

18 Claims, 5 Drawing Sheets

(56) References Cited

OTHER PUBLICATIONS

Luo et al., "An Empirical Analysis of Flaky Tests" in Proceedings of the 22nd ACM SIGSOFT International Symposium on Foundations of Software Engineering, Hong Kong, China, Association for Computing Machinery, Nov. 16-21, 2014, pp. 643-653.
Luo et al., "Flaky Test Handler Plugin" in Jenkins Wiki, dowloaded from //wiki.jenkins-ci.org/display/JENKINS/Flaky+Test+Handler+Plugin, Nov. 15, 2014, 5 pages.
Rich Trott, "Flaky test", downloaded from //github.com/nodejs/node/wiki/Flaky-tests, Jan. 26, 2016, 1 page.
Martin Poschenrieder, "How to Address Flaky Tests", downloaded from //blog.testmunk.com/how-to-address-flaky-tests/, Mar. 29, 2016, 5 pages.
Nebojša Stričević, "How to Deal With and Eliminate Flaky Tests", downloaded from //semaphoreci.com/community/tutorials/how-to-deal-with-and-eliminate-flaky-tests, May 27, 2015, 7 pages.

\* cited by examiner

FLAKY TEST SYSTEMS AND METHODS

BACKGROUND

The present disclosure relates to computing and data processing, and in particular, to flaky test systems and methods.

Computer software programs are typically written in code defined by one of a wide variety of computer software languages. Example languages include C++, Java, Javascript, C#, and the like. A developer typically writes code that often performs many functions, and then the code may be tested and deployed. One issue that arises in a test context pertains to repeatability of each test. Ideally, if the code is functioning properly, a test of the code should pass every time the test is performed, and, if the code is not functioning properly, a test of the code should yield failures every time. More specifically, for a test that includes multiple test routines to check the performance of various sub-functions of the code, each of the test routines should either pass or fail, but not both, every time a test program is executed against the code.

However, in some cases a test may fail on some occasions and pass on others with the same configuration of the code under test. Such tests could be harmful for developers because their failures do not always indicate bugs in the code.

The present disclosure provides techniques for improving software testing.

SUMMARY

In one embodiment, the present disclosure pertains to testing. In one embodiment, software tests are performed on a first software server. Tests may be repeated a plurality of times to check for consistent failures or passes. Test results are sent to a second software server. The test results are stored in one or more databases on the second software server, where particular test results are associated with one or more fields specifying whether the test was passed and whether the test was failed. Tests that were both passed and failed may be deemed "flaky" tests. The second software server may generate a query to retrieve test results from the database that both passed and failed at least one test (flaky tests). Flaky tests may be quickly retrieved and processed.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
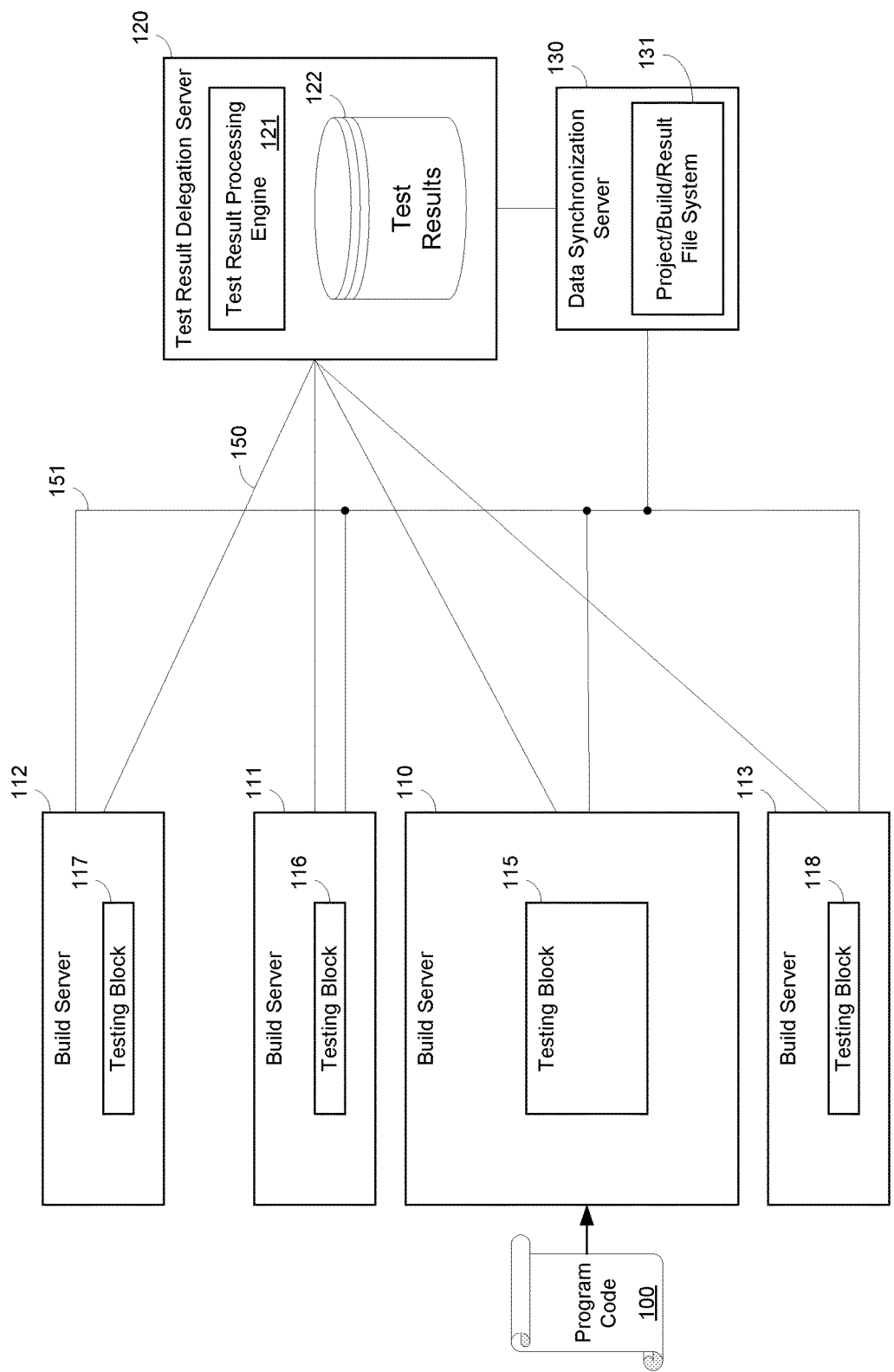
FIG. 1 illustrates an architecture for program testing according to one embodiment.

FIG. 1 illustrates an architecture for program testing according to one embodiment. Features and advantages of the present disclosure include storing test results from one software server on a second server for analysis of "flaky" behavior. For example, one software server 110 may execute a plurality of software tests on one or more software programs to produce a plurality of test results, where test results are stored on a second software server 120 and analyzed to discover tests with "flaky" behavior. Flaky tests are tests that may fail on some runs and pass on other runs of the same test. For example, a developer may write program code 100, which may require testing before the program can be released and used. Program code 100 may comprise hundreds, thousands, or even tens of thousands of lines of code with a wide range of functionality that may require testing. In some embodiments, when a particular test is passed, the test is marked accordingly ("Pass") and the next test is executed. However, when a particular test fails, the particular test may be re-executed a plurality of times by the server performing the tests to check for flaky behavior. Re-execution of the same test may result in failure each time, which is marked as a valid fail. However, if the test is flaky, re-execution may result in some additional fails and some passes.

In this example, program code 100 is received by a build server 110. In the field of software development, the term "build" may refer either to the process of converting source code files into standalone software artifact(s) that can be run on a computer, or the result of doing so (e.g., "a build"). A build server, or "build automation server," is a server that carries out the process of automating the creation of a software build and the associated processes, which may include compiling computer source code into binary code, packaging binary code, and running automated tests, for example. An example of a build server may enable Continuous Integration, which is the practice of merging all developer working copies to a shared mainline several times a day. Thus, some build servers are referred to as Continuous Integration (CI) servers or simply CI servers. One example build server that may be used in particular embodiments is a Jenkins server, which is an open source automation server written in Java.

In the example shown in FIG. 1, software server 110 is a build server, which may build, test, and deploy software programs such as program 100. Build server 110 may include a testing block 115 in addition to other functional components, for example. Build server 110 may receive program code 100 and, in addition to other operations, perform a number of software tests on the code, where the tests are defined by testing block 115, for example. Similarly, a plurality of other build servers 111-113 may include testing blocks 116-118, respectively, to execute a plurality of software tests on the plurality of software programs and produce a plurality of test results. Features and advantages of the present disclosure include a test result delegation server 120 to store the test results outside build server 110 and analyze the test results to reduce the processing burden on build server 110. For example, in one embodiment, software tests are executed by the build server, and test results are stored in a database 122 on test delegation server 120. Test results may be stored in database 122 and may comprise one or more fields specifying whether the test was passed and whether the test was failed. If the test was re-executed and produced fails and passes, such information may be stored in the database. For example, the final test results for such tests may be associated with one or more fields specifying that the same test both passed and failed. Tests that both pass and fail may be identified as flaky tests, for example. In some embodiments, test result delegation server 120 may receive test results from a plurality of build servers 110-113 to advantageously reduce the memory usage of the build servers and improve the efficiency of identifying and handling flaky tests, for example.

As mentioned above, software programs may contain a large number of code lines for a wide range of functions that may require a large number of tests that produce a large volume of test results. Storing the test results in a database outside the build server (e.g., on delegation server 120) advantageously reduces memory usage of the build server and further may allow analytics to be performed on the test data more efficiently. For example, in one embodiment, a test result processing engine 121 may generate a query to database 122 to retrieve test results from the database that both passed and failed at least one test (e.g., Flaky Tests). Thus, the system may advantageously store large volumes of test data and quickly retrieve flaky tests for particular projects, builds, or tests, for example. In one embodiment, flaky tests may be retrieved from database 122 and used to automatically remove problematic or unstable tests. In another embodiment, tasks or alerts may be generated automatically to notify particular developers that their code or test code needs to be evaluated for errors (bugs).

Features and advantages of the present disclosure may further include a data synchronization server 130, for example. In one embodiment, test results for a plurality of projects and a plurality of builds produced by build server 110, for example, and stored on test result delegation server 120 are synchronized by a data synchronization server 130. For example, data synchronization server 130 may receive test results from the build server 110, for example, after they are generated. Data synchronization server 130 may store the test results in a file system 131. In one embodiment, for example, the test results are stored in file system 131 based on a project identification and a build identification. In one embodiment, test results are stored in file system 131, as they are generated by build server 110, and then retrieved by test result delegation server 120 and stored in database 122 to synchronize the data generated by the build server with the database 122 on the delegation server 120. In another embodiment, when database 122 is initialized, the persistent data in file system 131 may be advantageously used to populate database 122 so the data are synchronized upon initialization of the delegation server. For example, upon initialization of test result delegation server 120, the test result delegation server may store each of the test results from file system 131 in database 122 in association with the project identification and the build identification.

Figure 2:
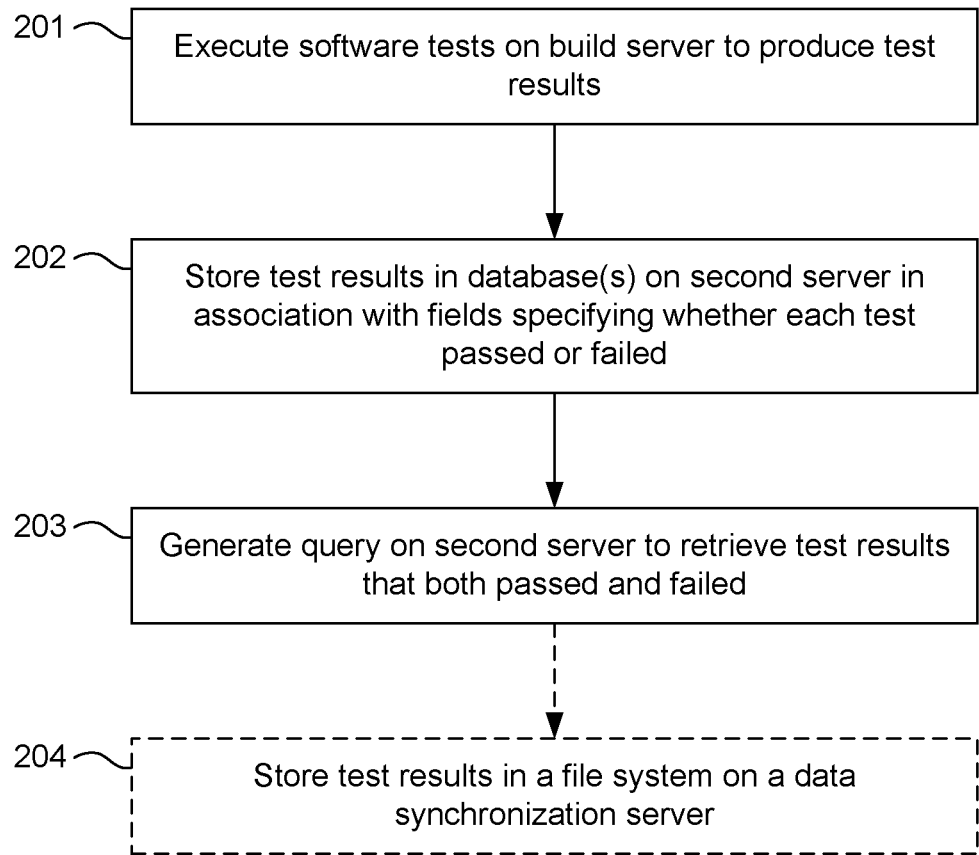
FIG. 2 illustrates a method according to one embodiment.

FIG. 2 illustrates a method according to one embodiment. At 201, software tests are executed on a first software server. The first software server may be a build server, for example. At 202, test results are stored in one or more databases on a second software server, such as test result delegation server 120. For example, particular test results may be associated with one or more fields specifying whether the test was passed and whether the test was failed. At 203, the second software server generates a query to retrieve test results from the database that both passed and failed at least one test (i.e., retrieve flaky tests). In some embodiments, test results for particular projects and builds produced by a build server and stored on the test result delegation server may be synchronized by a data synchronization server. For example, some embodiments may further store test results, at 204, in a file system of a data synchronization server based on a project identification and a build identification. In one embodiment, the data synchronization server may receive test results from the build server after they are generated and store the test results according to project and build. Advantageously, the data stored in the file system may be retrieved by the test result delegation server for storage in a database. Alternatively, during initialization of the delegation server or one or more databases therein, the databases may be populated with data persisted in the data synchronization server, for example.

Figure 3:
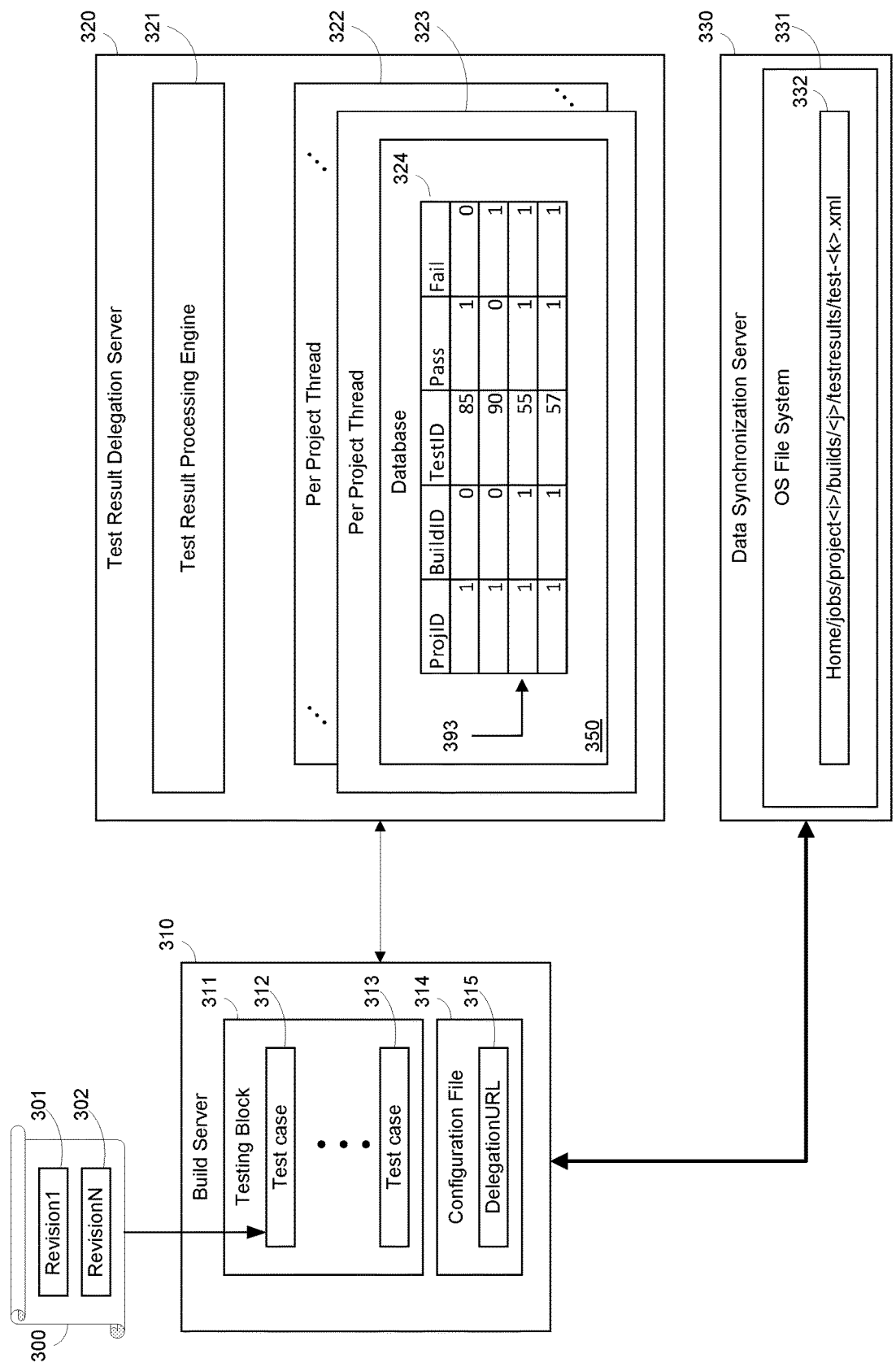
FIG. 3 illustrates an example architecture for program testing according to another embodiment.

FIG. 3 illustrates an example architecture for program testing according to another embodiment. In this example, program code 300 to be built and tested includes multiple revisions 301 and 302. For example, numerous software developers may produce a plurality of code revisions to one or more software programs that are received by one or more build servers 310. In this example, build server 310 includes a testing block 311 comprising a plurality of test cases 312-313 to test a plurality of code revisions 301-302 of program code 300, for example. To test a program or program revisions, there may be many test cases written in a test source code file. One example test case may be CalculationAggregationSpec.js. The content of CalculationAggregationSpec.js may include the following example test case, which tests for MAX and MIN2:

```
describe("test.fpa.ui.pa.reportEngine.integration.integration25.
CalculationAggregationSpec", function( ) {
describe("ProfitAndLoss ", function ( ) {
//............. many other ("test case")
it("MAX", function(done) {
   //check MAX
}
it("MIN2", function(done) {
   //check MIN
}
//............. many other ("test case")
);
```

Other test cases may be organized in this way, for example.

In one embodiment, to check for flaky behavior, when a particular test fails, the test is re-executed a plurality of times. For example, in one embodiment, a user, test developer, or system administrator may be able to specify an integer, N, which controls the number of times a test is repeated if it fails. For instance, if N is set equal to three (3), then if a test case fails, the failed test case may be repeated 3 times (e.g., two more times). If all 3 runs of the test result in failures, then the test is marked as a valid failure. However, if any of the subsequent runs pass, then the test may be identified as flaky.

As test cases are executed across numerous programs for numerous builds potentially on multiple build servers, a large volume of test result data may be generated. For example, after program code 300 is received in test block 311, the build server 310 executes a plurality of software tests to produce a plurality of test results. In one embodiment, test results may be formatted as an XML, document, for example. The test results may each be associated with a project identification and a build identification, for example. In this example, the test results may be offloaded from the build server. For example, build server 310 may include a configuration file 314 including a Universal Resource Locator (URL) ("DelegationURL") 315 for a test result delegation server 320, for example. DelegationURL 315 may be a RESTFUL Universal Resource Locators (URLs) specifying resources on the test result delegation server, for example. Representational state transfer (REST) or RESTful web services are a way of providing interoperability between computer systems on the Internet. REST-compliant Web services allow requesting systems to access and manipulate textual representations of Web resources using a uniform and predefined set of stateless operations. Build server 310 may access DelegationURL 315 to communicate with test result delegation server 320. For example, using DelegationURL 315, build server 310 may send a test completion signal. Additionally, build server 310 may store the test results in a file system 331 managed by an operating system (OS) on data synchronization server 330, for example. In this example, XML test results are stored in OS file system 331 having a pathname 332 based on the project identification, the build identification, and a test result identification (e.g., Home/jobs/project<i>/builds/<j>/testresults/test-<k>.xml). The test result identification may specify test results for particular test cases or group of related test cases, for example. The following is an example XML test result for the example test cases MAX and MIN2 above:

```
<?xml version="1.0" encoding="UTF-8"?>
<testsuites>
    <testsuite
name="test.sap.fpa.ui.pa.reportEngine.integration.FPA03.integration25.
CalculationAggregationSpec::ProfitAndLoss"
        timestamp="2017-07-17T18:54:24" hostname="localhost" time=
"241.564" errors="0" tests="2" skipped="0" failures="0">
        <testcase
classname="test.sap.fpa.ui.pa.reportEngine.integration.FPA03.
integration25.CalculationAggregationSpec::ProfitAndLoss"
            name="MAX" time="47.832" rerunSuccessAsFailure="false">
            <flakyFailure type="exception"
                message="Error: Timeout - Async callback was
not invoked within timeout specified by jasmine.
DEFAULT_TIMEOUT_INTERVAL.">
                <![CDATA[Error: Timeout - Async callback was not invoked
within timeout specified by jasmine.
DEFAULT_TIMEOUT_INTERVAL.
    at eval (eval at module.exports http://XXX),
<anonymous>:1764:23)]]></flakyFailure>
        </testcase>
        <testcase
classname="test.sap.fpa.ui.pa.reportEngine.integration.FPA03.
integration25.CalculationAggregationSpec::ProfitAndLoss"
            name="MIN2" time="0.008"></testcase>
    </testsuite>
</testsuites>
```

For the above XML, the test case named "MIN2" passes in the build, but for the test case named "MAX", it has a <flakyFailure/> element, which means this test case failed once and passed once. In this example, every failure before the final success may be recorded as <flakyFailure/> in the test report XML. A job number (project ID) may be stored/managed by a Jenkins Build Server, for example. In one embodiment, the build server stores the project ID as folders inside the "Project" folder. For example, a project named "Project A" may be assigned a dedicated new folder by the build server, e.g. /var/lib/Jenkins/jobs/ProjectA. In that folder, there may be a config.xml file which stores the settings of the project, for example. If the project has run for 3 times, there may be 3 folders named "1", "2", "3" under that project folder which indicates these 3 project build numbers, for example.

As mentioned above, multiple build servers may test multiple software programs using numerous test cases and delegate test results and analysis to a single test result delegation server 320. When a test is done, the test result delegation server 320 may receive a test completion signal from a build server conducting a test. In one embodiment, the test completion signal may include the project identification and the build identification. In one embodiment, the test completion signal includes the project ID, build ID, and test ID so the delegation server 320 may access XML test results stored in file system 331 of data synchronization server 330. In another embodiment, the delegation server 320 may download the XML, test results from the build server, for example. Once the test results are available to the delegation server, the delegation server may parse the XML file, for example, and generate a result summary file, such as FlakyStatsResult.xml, for example. An example result summary file is as follows:

```
<entry>
<string>test.fpa.ui.pa.reportEngine.integration.FPA03.integration25.
CalculationAggregationSpec::ProfitAndLoss.MAX</string>
<com.google.jenkins.flakyTestHandler.plugin.HistoryAggregatedFlaky-
TestResultAction_-SingleTestFlakyStatsWithRevision>
    <stats>
      <pass>1</pass>
      <fail>1</fail>
      <flake>1</flake>
      <buildNumber>0</buildNumber>
      <testId>55</testId>
    </stats>
    <buildNumber>0</buildNumber>
    <revision>75061f04ad23068efedc76e24daaec3c4040b62f</revision>
</com.google.jenkins.flakyTestHandler.plugin.HistoryAggregatedFlaky-
TestResultAction_-SingleTestFlakyStatsWithRevision>
</entry>
```

The delegation server 320 may then generate a record according to the above xml <entry/> and insert that record into database 350. For example, row 393 stored in table 324 of database 350 shows the database record for the above XML test result.

FIG. 3 illustrates another feature that may be used in some embodiments. As mentioned above, test result delegation server 320 and data synchronization server 330 may receive voluminous test results from many build servers, for example, and thus servers 320 and 330 may need to process large amounts of data. In one embodiment, test result processing engine 321 may create different threads for different jobs, or projects. In one embodiment, each project thread 322-323 may include a different instance of a database 350 with internal tables for storing test result data specifically for a particular project, for example. Accordingly, test result delegation server 320 may comprise a plurality of threads corresponding to different project IDs (aka jobIDs). Each thread, when executed, comprises a corresponding database, such as database 350, where test results having different project IDs are stored in different databases corresponding to the project IDs. This has the advantage of improving the processing speed of the system and the ability to handle large amounts of data potentially from multiple build servers, for example.

FIG. 3 further illustrates an example of how test results may be stored. In this example, test results are stored by test result delegation server processing engine 321 in database 350, where the test results are associated with a first field (e.g., "Pass") specifying whether the test was passed and a second field ("Fail") specifying whether the test was failed. For example, testID 85, for project 1 and build 0 passed and had no failures. This is a valid pass. TestID 90 for project 1/build 0 failed, and subsequent repeats of the test triggered by a first failure all resulted in failures, for example. Thus, this is a valid failure. However, testIDs 55 and 57 failed on a first run, and subsequent runs produced at least one pass. Thus, the first field ("Pass") and the second field ("Fail") are both set to 1 in this example, which designates these tests a flaky tests. Similarly, numerous other test results may have both a first field specifying the test was passed and a second field specifying the test failed, indicating such tests were flaky.

Various embodiments of the present disclosure may use the information stored in database(s) 350 for a variety of purposes. In one embodiment, test result processing engine 321 on test result delegation server 320 may generate a query to retrieve test results that both passed and failed at least one test. Accordingly, flaky tests may be quickly identified and retrieved for a wide range of additional uses. In one embodiment, delegation server 320 may send a message to one or more build servers and indicate that the particular flaky test case should be removed from a test sequence. In another embodiment, flaky tests may be matched to particular developers (e.g., by project, build, and/or test IDs) and the developers may receive an automated message indicating that their code is unstable or has a bug. If a repository is used for managing bugs, an entry in the bug management system may be created automatically from the flaky test query results and automatically assigned to a developer to fix the bug, for example. Advantageously, offloading test results from the build server reduces the memory usage for storing results and increases the possible uses of the test result data for analyzing and correcting flaky tests, for example. An example SQL statement for analyzing test data in a database is shown in APPENDIX A.

Figure 4:
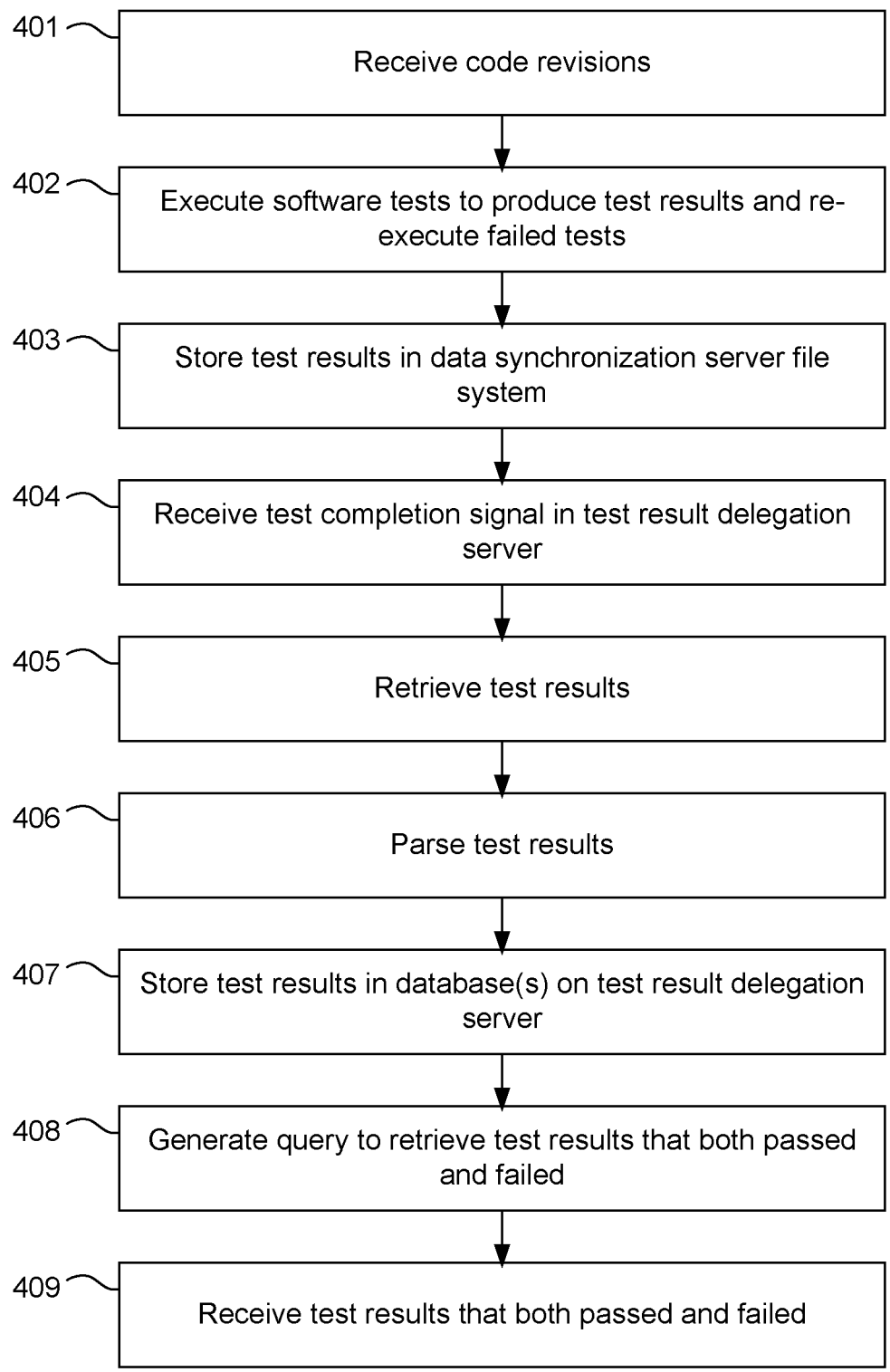
FIG. 4 illustrates a method according to another embodiment.

FIG. 4 illustrates a method according to another embodiment. At 401, one or more build servers may receive a plurality of code revisions to a plurality of software programs. At 402, the build servers may execute a plurality of software tests on the plurality of software programs to produce a plurality of test results. The test results may each be associated with a project identification and a build identification, for example, and when a particular test fails, the particular test is re-executed a plurality of times to determine if the test if flaky (i.e., passes sometimes and fails others). At 403, the test results are stored in a file system in a data synchronization server. The file system may have a pathname based on the project identification, the build identification, and a test result identification, for example. At 404, the test result delegation server receives a test completion signal for each software test from the build servers performing tests (not necessarily at the same time). The test completion signal may include the project identification and the build identification, for example. At 405, test results corresponding to the test completion signal are retrieved from the data synchronization server file system to the test result delegation server. At 406, the test result delegation server may parse the test results. In one embodiment, the test result delegation server parses the test results and generates an XML file similar to the example shown above. At 407, the test result delegation server stores the test results in one or more databases. For example, the stored test results may be associated with a first field specifying whether the test was passed and a second field specifying whether the test was failed. A plurality of test results may have both a first field specifying the test was passed and a second field specifying the test failed to specify a flaky test, for example. At 408, the test result delegation server generates a query to retrieve test results that both passed and failed at least one test (i.e., flaky tests). At 409, the tests that both passed and failed a test (the flaky tests) are received and processed, for example, to remove the flaky test or notify developers of a bug that requires fixing, for example.

Hardware

Figure 5:
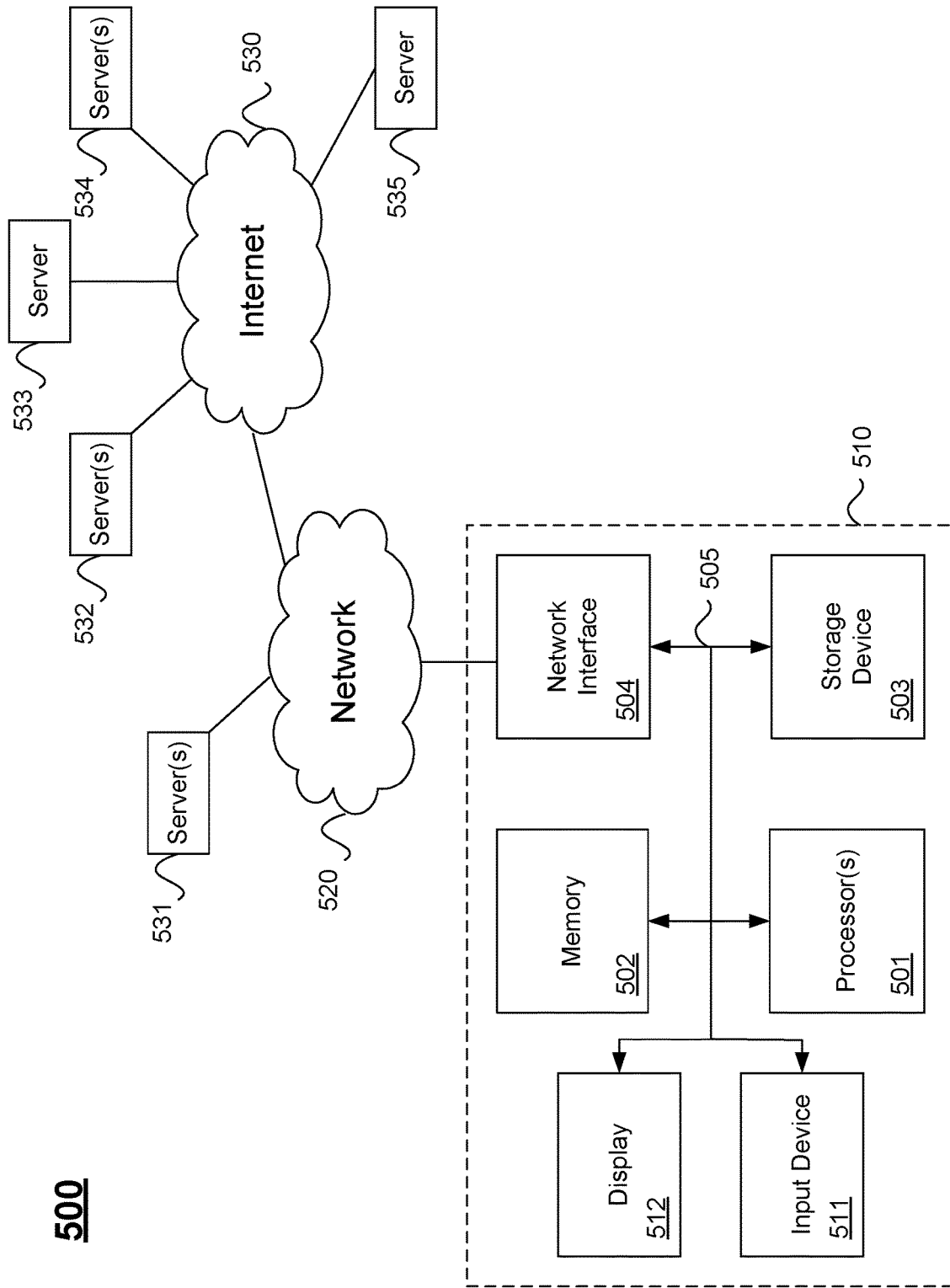
FIG. 5 illustrates hardware of a special purpose computing machine configured according to the above disclosure.

FIG. 5 illustrates hardware of a special purpose computing machine configured according to the above disclosure. The following hardware description is merely one example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes a memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device 503 and memory 502 are both examples of non-transitory computer readable storage mediums.

Computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a browser, for example, may access data and features on backend software systems that may reside on multiple different hardware servers on-prem 531 or across the Internet 530 on servers 532-535. One or more of servers 532-535 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

APPENDIX A

In some embodiments, the delegate server's job is to parse the test reports, then insert rows/records of the test case results into the database for that project, then analyze which test cases are flaky by utilizing SQL statements. The following is an example SQL for analyzing test cases:

```
SELECT
  jobId,
  testId,
  revision,
  group_concat(number, ",") AS allNumbers,
  sum(finalRevPass) AS totalPass,
  sum(finalRevFail) AS totalFail,
  sum(finalRevFlake) AS totalFlake
FROM
(SELECT
  *,
  (CASE WHEN revPass>0 AND revFail>0
    THEN 0
  ELSE revPass>0 END) AS finalRevPass,
  (CASE WHEN revPass>0 AND revFail>0
    THEN 0
  ELSE revFail>0 END) AS finalRevFail,
  (CASE WHEN revPass>0 AND revFail>0
    THEN 1
  ELSE revFlake>0 END) AS finalRevFlake
FROM
  (SELECT
    *,
    sum(pass) AS revPass,
    sum(fail) AS revFail,
    sum(flake) AS revFlake
  FROM build_info
  GROUP BY revision, testId)
)
GROUP BY testId
HAVING totalFlake>0;
```

What is claimed is:

1. A method comprising:
executing, by a plurality of first software servers, a plurality of software tests on one or more software programs to produce a plurality of test results;
storing, by a second software server, the test results from the plurality of first software servers in a database, wherein particular test results are associated with one or more fields specifying whether the test was passed and whether the test was failed; and
generating, by the second software server, a query to retrieve test results originating from each of the plurality of first software servers as stored in the database indicating one or more flaky tests, wherein the one or more flaky tests are specific ones of the plurality of software tests that one of the one or more software programs both passed and failed on repeat runs with a same test configuration;
wherein test results for a plurality of projects are stored in a plurality of different databases on the second software server, and wherein the second software server comprises a plurality of threads corresponding to different projects, wherein each thread, when executed, comprises a corresponding database, and wherein test results for different projects are stored in different databases corresponding to the projects.

2. The method of claim 1 wherein when a particular test fails, the particular test is re-executed a plurality of times by the first software server, and wherein a plurality of test results are associated with one or more fields specifying that the same test both passed and failed.

3. The method of claim 1 wherein a data synchronization server receives test results from the first software server after they are generated and stores the test results in a file system based on a project identification and a build identification.

4. The method of claim 1 wherein test results for a plurality of projects and a plurality of builds produced by the first software server and stored on the second software server are synchronized by a data synchronization server.

5. The method of claim 4 wherein, upon initialization of the second software server, the second software server stores each of the test results from the file system in the database in association with the project identification and the build identification.

6. The method of claim 1 wherein the one or more first software servers are build servers configured to build, test, and deploy the software programs.

7. The method of claim 1 wherein the first software server comprises a Universal Resource Locator (URL) specifying resources on the second software server.

8. A method comprising:
receiving, by a plurality of build servers, a plurality of code revisions to a plurality of software programs;
executing, by the plurality of build servers, a plurality of software tests on the plurality of software programs to produce a plurality of test results, wherein the test results are each associated with a project identification and a build identification, and wherein when a particular test fails, the same particular test is re-executed a plurality of times;
storing the test results, by a data synchronization server, in a file system having a pathname based on the project identification, the build identification, and a test result identification;
receiving, in a test result delegation server from the plurality of build servers, a test completion signal for each software test, the test completion signal including the project identification and the build identification;
retrieving test results corresponding to the test completion signal from the data synchronization server file system to the test result delegation server;
storing, by the test result delegation server, the test results in one or more databases, wherein the stored test results are associated with a first field specifying whether the test was passed and a second field specifying whether the test was failed, and wherein a plurality of test results have both a first field specifying the test was passed and a second field specifying the test failed; and
generating, by the test result delegation server, a query to retrieve test results originating from each of the plurality of build servers indicating one or more flaky tests, wherein the one or more flaky tests are specific ones of the plurality of software tests that one of the plurality of software programs both passed and failed on repeat runs with a same test configuration.

9. The method of claim 8 wherein test results for a plurality of projects are stored in a plurality of different databases on the second software server, and wherein the second software server comprises a plurality of threads corresponding to different projects, wherein each thread, when executed, comprises a corresponding database, and wherein test results for different projects are stored in different databases corresponding to the projects.

10. The method of claim 8 wherein the test results are extended markup language (XML) files, the method further comprising, before storing the test results in the one or more databases, parsing the XML test results, by the test result delegation server, to produce an XML test result summary file, wherein storing the test results comprises storing information from the XML test summary file.

11. The method of claim 8 further comprising, upon initialization of the test result delegation server, storing each of the test results from the file system in the database in association with the project identification and build identification.

12. A non-transitory machine-readable medium storing a program executable by at least one processing unit of a device, the program comprising sets of instructions for:
  executing, by a plurality of first software servers, a plurality of software tests on one or more software programs to produce a plurality of test results;
  storing, by a second software server, the test results from the plurality of first software servers in a database, wherein particular test results are associated with one or more fields specifying whether the test was passed and whether the test was failed; and
  generating, by the second software server, a query to retrieve test results originating from each of the plurality of first software servers as stored in the database indicating one or more flaky tests, wherein the one or more flaky tests are specific ones of the plurality of software tests that one of the one or more software programs both passed and failed on repeat runs with a same test configuration;
  wherein test results for a plurality of projects are stored in a plurality of different databases on the second software server, and wherein the second software server comprises a plurality of threads corresponding to different projects, wherein each thread, when executed, comprises a corresponding database, and wherein test results for different projects are stored in different databases corresponding to the projects.

13. The non-transitory machine-readable medium of claim 12 wherein when a particular test fails, the particular test is re-executed a plurality of times by the first software server, and wherein a plurality of test results are associated with one or more fields specifying that the same test both passed and failed.

14. The non-transitory machine-readable medium of claim 12 wherein a data synchronization server receives test results from the first software server after they are generated and stores the test results in a file system based on a project identification and a build identification.

15. The non-transitory machine-readable medium of claim 12 wherein test results for a plurality of projects and a plurality of builds produced by the first software server and stored on the second software server are synchronized by a data synchronization server.

16. The non-transitory machine-readable medium of claim 15 wherein, upon initialization of the second software server, the second software server stores each of the test results from the file system in the database in association with the project identification and the build identification.

17. The non-transitory machine-readable medium of claim 12 wherein the one or more first software servers are build servers configured to build, test, and deploy the software programs.

18. The non-transitory machine-readable medium of claim 12 wherein the first software server comprises a Universal Resource Locator (URL) specifying resources on the second software server.

* * * * *